United States Patent
Tanida et al.

(12) 
(10) Patent No.: US 6,373,684 B2
(45) Date of Patent: Apr. 16, 2002

(54) CERAMIC ELECTRONIC COMPONENT HAVING LEAD TERMINAL

(75) Inventors: Toshiaki Tanida; Mitsuru Nagashima, both of Shimane-ken; Osamu Yamaoka, Izumo, all of (JP)

(73) Assignee: Murata Manufacturing Co, Ltd., Kyoto (JP)

(*) Notice: Subject to any disclaimer, the term of this patent is extended or adjusted under 35 U.S.C. 154(b) by 0 days.

(21) Appl. No.: 09/784,844

(22) Filed: Feb. 16, 2001

(30) Foreign Application Priority Data

Mar. 14, 2000  (JP) .......................... 12-070002

(51) Int. Cl.⁷ .................. H01G 4/008; H01G 4/12
(52) U.S. Cl. .................. 361/305; 361/306.3; 361/307; 361/306.1
(58) Field of Search ............... 361/303, 306.1, 361/306.2, 306.3, 307, 308.1, 309, 310, 313, 321.2, 321.4, 321.5

(56) References Cited

U.S. PATENT DOCUMENTS

| | | | | |
|---|---|---|---|---|
| 3,581,167 A | * | 5/1971 | Veater et al. | 361/321.2 |
| 5,262,920 A | * | 11/1993 | Sakuma et al. | 361/321.5 |
| 6,043,973 A | * | 3/2000 | Nagashima et al. | 361/305 |

* cited by examiner

Primary Examiner—Anthony Dinkins
(74) Attorney, Agent, or Firm—Keating & Bennett, LLP

(57) ABSTRACT

A ceramic electronic component includes electrodes each having a four layer structure including a first electrode layer made of an Ni—Ti alloy and constructed so as to adhere closely to the surface of a ceramic material defining a ceramic element, a second electrode layer made of at least one selected from the group consisting of Cu, Ag, and Au, disposed on the first electrode layer, a third electrode layer made of an Ni—Ti alloy, disposed on the second electrode layer, and a fourth electrode layer made of at least one selected from the group consisting of Cu, Ag, and Au, disposed on the third electrode layer. Lead terminals are bonded to the electrodes having the four layer structures via solder members, respectively.

9 Claims, 1 Drawing Sheet

CERAMIC ELECTRONIC COMPONENT HAVING LEAD TERMINAL

BACKGROUND OF THE INVENTION

1. Field of the Invention

The present invention relates to a ceramic electronic component, and more particularly, to a ceramic electronic component having lead terminals in which the lead terminals are bonded to electrodes disposed on a ceramic element.

2. Description of the Related Art

Single sheet type ceramic capacitors (so-called sheet ceramic capacitors), e.g., having electrodes provided on a single sheet (sheet ceramic body) made of a dielectric ceramic, respectively, have a structure in which the electrodes are provided on both of the front and back surfaces of the sheet ceramic body, and lead terminals are bonded to the electrodes via solder.

Conventionally, the electrodes may be baked electrodes formed by applying an electrode paste containing as electroconductive components Ag, Cu, or the like which are metals capable of being easily soldered, and also, or may be plating electrodes formed by a wet plating method.

Moreover, in recent years, investigation has been made of adoption of Ni electrodes, Zn electrode, or the like, which are formed by applying and baking an electrode paste containing a metal such Ni, Zn, or the like as an electroconductive component or by wet plating the metal in which Sn contained in the solder is prevented from diffusing.

With respect to the ceramic capacitors having the structure in which the lead terminals are bonded to the baking electrodes or the wet plating electrodes made of Ag, Cu or the like via solder, when the ceramic capacitors are used in a high temperature environment (e.g., a temperature of about 150° C.), Sn contained in the solder used to bond the lead terminals is diffused in the electrodes. As a result, an adhesion force between a ceramic constituting the ceramic element and the electrodes is reduced. This may cause an increase in the dielectric loss of the ceramic capacitor, and may cause the ceramic element to be broken, due to corona-discharging in a void generated between the electrodes and the ceramic, depending on the situation.

Furthermore, regarding the baking electrodes or the wet plating electrodes made of Ni, Zn, or the like, soldering of the lead terminals to the electrodes can not be easily performed. Thus, in some cases, it is necessary to use chlorine-type fluxes, which are questionable from the standpoint of reliability, or to provide another electrode for bonding.

For the purpose of solving the above-described problems, a method (multi-layer structure method) has been proposed, in which an electrode layer to be bonded closely to a ceramic is formed by sputtering, and a soldering layer made of an electrode material having high soldering properties is formed on the electrode layer. Even in the case of a product having electrodes formed by the above-described method, characteristics of the product may be deteriorated when the product is used under a high temperature condition. In fact, the problem with deterioration of the characteristics, caused when used in a high temperature environment, can not be satisfactorily solved.

SUMMARY OF THE INVENTION

To overcome the problems described above, preferred embodiments of the present invention provide a ceramic electronic component having lead terminals constructed to be soldered to electrodes easily and securely, having a very high reliability of connection of the lead terminals, and minimized deterioration of characteristics of the component, which may be caused by use in a high temperature environment.

To achieve the above-described advantages, according to a preferred embodiment of the present invention, a ceramic electronic component includes electrodes disposed on the surface of a ceramic element, and lead terminals attached to the electrodes, the electrodes each having a four layer structure including (a) a first electrode layer made of an Ni—Ti alloy and constructed so as to be bonded to the surface of a ceramic material of the ceramic element, (b) a second electrode layer made of at least one selected from the group consisting of Cu, Ag, and Au, disposed on the first electrode layer, (c) a third electrode layer made of an Ni—Ti alloy, disposed on the second electrode layer, and (d) a fourth electrode layer made of at least one selected from the group consisting of Cu, Ag, and Au, disposed on the third electrode layer, the lead terminals each being bonded to the electrode having the four layer structure preferably via solder.

The lead terminals can be securely bonded to the electrodes, and deterioration of the characteristics of the component when used in a high temperature environment can be prevented by constructing each of the electrodes so as to have a four layer structure including the first electrode made of an Ni—Ti alloy and arranged so as to be bonded to the surface of the ceramic material constituting the ceramic element, the second electrode layer made of at least one selected from the group consisting of Cu, Ag, and Au and disposed on the first electrode layer, the third electrode layer made of an Ni—Ti alloy and disposed on the second electrode layer, and the fourth electrode layer made of at least one selected from the group consisting of Cu, Ag, and Au and disposed on the third electrode layer, and soldering the lead terminals to the electrode having the four layer structure.

In preferred embodiments of the present invention, as a material for constituting the first electrode layer, an Ni—Ti alloy is preferably used because it can achieve an appropriate bonding force for bonding to the ceramic material of the ceramic element. It is presumed that the bonding force between an alloy and a ceramic is a result of bonding between oxygen in the ceramic and the metal (alloy). If the bonding force between the oxygen and the metal is low, the adhesion is insufficient. If the bonding force is excessively high, characteristics of a product will be deteriorated, due to the reduction of the ceramic material. In the case of the Ni—Ti alloy used in preferred embodiments of the present invention, a sufficient bonding force can be obtained without deterioration of other characteristics of the product.

The second electrode layer performs a function of securing the conductivity in a high temperature environment and preventing deterioration of the component characteristics. In preferred embodiments of the present invention, as a material for constituting the second electrode layer, at least one selected from the group consisting of Cu, Ag, and Au is preferably used.

The third electrode layer performs a function of preventing diffusion of a solder component from proceeding into the second electrode layer. In preferred embodiments of the present invention, as a material for constituting the third electrode layer, an Ni—Ti alloy is preferably used such that diffusion of a solder component is minimized.

The lead terminals are soldered to the fourth electrode layer. In preferred embodiments of the present invention, at least one selected from the group consisting of Cu, Ag, and Au is preferably used as a metal having a high wettability for solder.

That is, in the ceramic electronic component having lead terminals in accordance with preferred embodiments of the present invention:

(1) the first electrode layer has a function of securing appropriate bonding properties for the ceramic material of the ceramic element, (2) the second electrode layer has a function of securing the conductivity in a high temperature environment, (3) the third electrode layer has a function of preventing a solder component from diffusing, and (4) the fourth electrode layer has a function of securing a good wettability for solder, so that the reliability of connection of the lead terminals to the electrodes can be maintained at a high value, and deterioration of characteristics of the component, caused by use in a high temperature environment, can be minimized.

Preferably, the first, second, third, and fourth electrode layers each constituting the electrode are formed by a sputtering method, respectively.

The electrodes having high adhesive properties and soldering properties for the ceramic constituting the ceramic element can be produced easily and securely by forming the first, second, third, and fourth electrode layers each constituting the electrode by a sputtering method, respectively.

However, other methods of forming each of the first, second, third and fourth layers may be used.

Also preferably, the content of Ti of the Ni—Ti alloy constituting the first and third electrode layers is in the range of from about 5% to about 20% by weight.

The electrodes having high adhesion and soldering properties for the ceramic element can be formed easily and securely by setting the content of Ti (ratio of Ti) of the Ni—Ti alloy constituting the first and third electrode layers to be in the range of from about 5% to about 20% by weight. Thus, preferred embodiments of the present invention are practically effective.

One of the reasons for setting the content of Ti (ratio of Ti) of the Ni—Ti alloy to be in the range of about 5% to about 20% by weight is as follows. If the content of Ti is less than about 5% by weight, adhesion of the alloy to the ceramic constituting the ceramic element can not be secured, and moreover, with the ratio of Ni being excessively increased, the Ni—Ti alloy is magnetized, so that the magnetron sputtering method can not be applied. Moreover, if the content of Ti exceeds about 20% by weight, the reaction to the ceramic causes heterogeneous phases between the electrodes and the ceramic. This causes the dielectric loss to increase.

The content of Ti of the Ni—Ti alloy constituting the first and third electrode layers may be in the range of from about 5% to about 10% by weight.

One of the reasons for setting the content of Ti (ratio of Ti) of the Ni—Ti alloy to be in the range of from about 5% to about 10% by weight is as follows. Adhesion of the alloy to a ceramic constituting the ceramic element is excellent, and the increase of the dielectric loss, caused by heterogeneous phases, can be securely prevented.

Also preferably, in the ceramic electronic component having lead terminals, the ceramic element is a sheet ceramic body made of a dielectric ceramic for a single sheet type ceramic capacitor, and the ceramic electronic component is the single sheet type ceramic capacitor.

When preferred embodiments of the present invention are applied to the single sheet type ceramic capacitor having lead terminals in which the ceramic element is a sheet ceramic body made of a dielectric ceramic for the single sheet type ceramic capacitor, a ceramic capacitor having lead terminals achieves high adhesion of the electrodes to the ceramic element, a high soldering strength of the lead terminals to the electrodes, and moreover, excellent stability of the capacitor when used in a high temperature environment.

Other features, characteristics, elements and advantages of the present invention will become more apparent from the detailed description of preferred embodiments thereof with reference to the attached drawings.

DETAILED DESCRIPTION OF PREFERRED EMBODIMENTS

Figure 1:
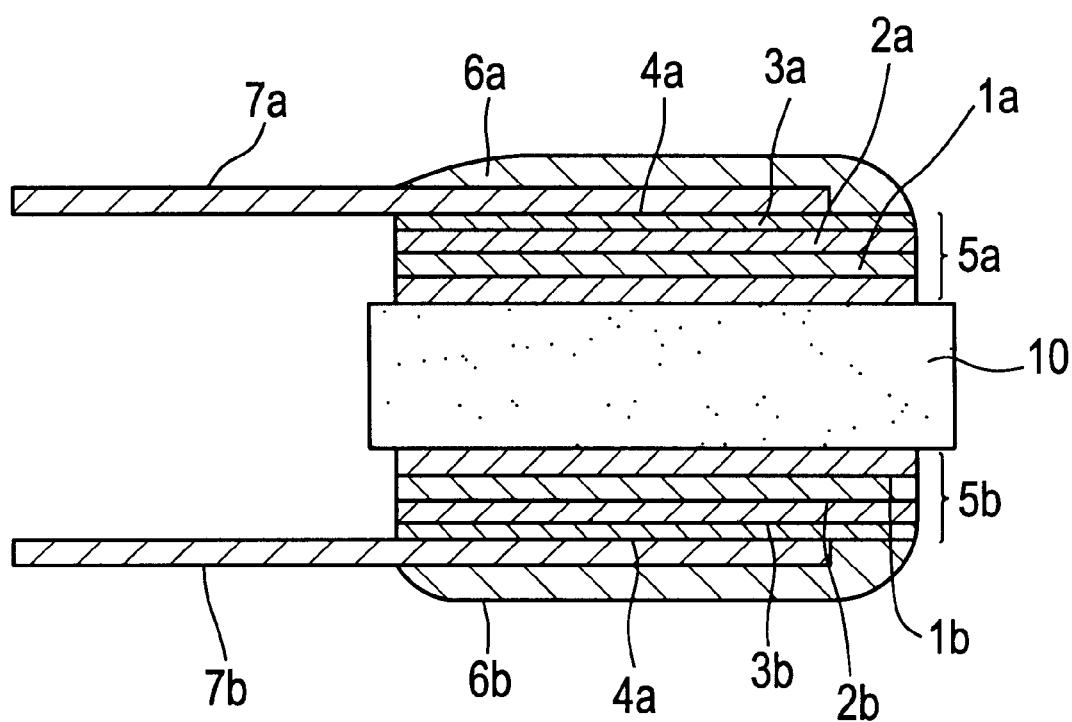
FIG. 1 is a cross-sectional view of a ceramic electronic component having lead terminals (single sheet ceramic capacitor having lead terminals) according to a preferred embodiment of the present invention.

Hereinafter, features of the present invention will be made more apparent in the following description of preferred embodiments of the present invention.

In a preferred embodiment, a single sheet type ceramic capacitor is described as an example, which has the structure in which lead terminals are bonded to electrodes disposed on both of the front and back surfaces of a sheet ceramic body (ceramic element for a single sheet ceramic capacitor).

As shown in FIG. 1, a single sheet ceramic capacitor having lead terminals (hereinafter, referred to as a capacitor briefly) of this preferred embodiment includes a sheet ceramic body 10 made of a dielectric ceramic, electrodes 5a and 5b disposed on both of the front and back surfaces of the ceramic body 10, and lead terminals 7a and 7b bonded to the electrodes 5a and 5b preferably via solder members 6a and 6b.

The ceramic body 10 is preferably made from a dielectric ceramic such as a $BaTiO_3$ type, an $SrTiO_3$ type, a $TiO_2$ type, or other suitable material.

Furthermore, the electrodes 5a and 5b to be disposed on both major surfaces of the ceramic body 10 are heated up to a predetermined temperature, by a magnetron sputtering method.

The temperature at which the ceramic body 10 is heated for sputtering is optional. Preferably, the temperature is set at about 150° C. or lower from the standpoint of a reduced residual heat stress in the ceramic body 10.

In the capacitor of this preferred embodiment, the electrodes 5a and 5b include a four-layer structure, that is, first electrode layers 1a and 1b, second electrode layers 2a and 2b, third electrode layers 3a and 3b, and fourth electrode layers 4a and 4b, respectively.

The first electrode layers 1a and 1b partially constituting the electrodes 5a and 5b are preferably made of an Ni—Ti alloy, respectively, and formed so as to bond closely to both sides (surfaces) of the ceramic body 10.

With respect to the Ni—Ti alloy, an appropriate bonding force can be provided between the Ni—Ti alloy and a ceramic constituting the ceramic body 10. In addition, the Ni—Ti alloy is an electrode material of which deterioration of the characteristics is minimized when the ceramic is reduced. Compositions each having a Ti content (ratio of Ti) in a range of about 5% to about 20% by weight are used as the Ni—Ti alloy. The reason is as follows. If the Ti content of the Ni—Ti alloy is less than about 5% by weight, the bonding force between the alloy and the ceramic is insufficient. That is, a desired bonding strength cannot be obtained. If the Ti content is greater than about 20% by weight, the characteristics of the Ni—Ti alloy are deteriorated due to reduction of the ceramic.

The second electrode layers 2a and 2b partially constituting the electrodes 5a and 5b are formed on the surface of the first electrode layers 1a and 1b, respectively, and are made of at least one selected from the group consisting of Cu, Ag, and Au. The second electrode layers 2a and 2b are provided in order to secure the conductivity.

The third electrode layers 3a and 3b partially constituting the electrodes 5a and 5b are provided in order to prevent degradation of the conductivity, caused by oxidation of the second electrode layers 2a and 2b, or diffusion of solder components from the solder members 6a and 6b used for bonding of the lead terminals 7a and 7b. The third electrode layers 3a and 3b are preferably made of an Ni—Ti alloy. That is, the third electrode layers, preferably made of the Ni—Ti alloy, have a high corrosion resistance, and perform a function of preventing diffusion of Sn and Pb as solder components to protect the second electrode layers 2a and 2b.

Furthermore, the fourth electrode layers 4a and 4b partially constituting the electrodes 5a and 5b have high wettability for the solders 6a and 6b, and carry out a function of securing soldering-properties of the lead terminals.

Hereinafter, electrical characteristics of the capacitor according to a preferred embodiment of the present invention.

As a capacitor (sample) to be subjected to measurement of characteristics, a single sheet ceramic capacitor having lead terminals was prepared by the following method.

(1) The ceramic body 10 made of a BaTiO$_3$ type having a disk shape with a diameter of about 13 mm and a thickness of about 0.5 is heated to about 100° C. in an environment at a vacuum degree of about 10 Pa to about 2 Pa, and thereafter, the first electrode layers 1a and 1b made of an Ni—Ti alloy (Ni—Ti alloy with an Ti content of about 7.5% by weight) are formed on both of the upper and under sides of the ceramic body 10 so as to have a thickness of about 200 nm by a magnetron sputtering method.

(2) Next, the second electrode layers 2a and 2b made of Cu are formed on the first electrode layers 1a and 1b so as to have a thickness of about 200 nm by the magnetron sputtering method.

(3) Thereafter, the third electrode layers 3a and 3b made of an Ni—Ti alloy (Ni—Ti alloy with an Ti content of about 7.5% by weight) are formed on the second electrode layers 2a and 2b so as to have a thickness of about 100 nm by the magnetron sputtering method.

(4) Moreover, the fourth electrode layers 4a and 4b made of Cu are formed on the third electrode layers 3a and 3b so as to have a thickness of about 100 nm by the magnetron sputtering method.

(5) Then, lead terminals 7a and 7b of a soft copper wires to be soldered, having a diameter of about 0.6 mm are bonded to the electrodes 5a and 5b having the four-layer structure formed on both sides of the ceramic body 10 via solder members 6a and 6b. Thus, the single sheet ceramic capacitor having the lead terminals is produced as a sample for determination of characteristics.

A capacitor (example 1) prepared as described above was left to stand for 1000 hrs while the capacitor was kept at a temperature of about 125° C. The electrical characteristics (dielectric constant, dielectric loss, and insulation resistance) of the capacitor taken as a sample were measured.

TABLE 1 shows the results.

TABLE 1

| Electrode | Electrical characteristics at 125° C. after 1000 hrs. | | | | Adhesion force (N) |
|---|---|---|---|---|---|
| | Apparent dielectric constant ∈r | Dielectric loss (%) | Insulation resistance (MΩ) | Solder wettability | |
| Example 1 | 8250 | 0.35% | 70000 | good | 37 |
| Comparative Example 1 Cu thick film electrode | 6800 | 0.78% | 68000 | good | 33 |
| Comparative Example 2 sputtering electrode Cu/Ti/Ni—Cu 300 nm/100 nm/300 nm | 8250 | 0.50% | 70000 | good | 18 |
| Comparative Example 3 sputtering electrode Cu/Ni—Cu 300 nm/300 nm | 7200 | 0.78% | 70000 | good | 13 |

TABLE 1 also lists data concerning the wettability of the electrodes and the adhesion force of the electrodes to the ceramic body.

Moreover, in Table 1, the measured electrical characteristics of the following comparative examples 1, 2, and 3 are shown together with the electrical characteristics of the samples of the above preferred embodiments.

(1) the capacitor having Cu thick film electrode layers as electrodes (comparative example 1)
(2) the capacitor (comparative example 2) provided with electrodes each having the three layer structure including:
  (a) a first electrode layer made of Cu (lower layer electrode): thickness of about 300 nm
  (b) a second electrode layer made of Ti (intermediate layer electrode): thickness of about 100 nm, and
  (c) a third electrode layer made of Ni—Cu (upper layer electrode): thickness of about 300 nm.
(3) the capacitor (comparative example 3) provided with electrodes having the two layer structure including:
  (a) a first electrode layer made of Cu (lower layer electrode): thickness of about 300 nm
  (b) a second electrode layer made of Ni—Ti (upper layer electrode): thickness of about 300 nm.

As seen in TABLE 1, for the capacitors of the examples, the electrical characteristics, that is, the dielectric constants, the dielectric losses, and the insulation resistances, the wettability of the electrodes for the solders, and the adhesion forces of the electrodes for the ceramic body are comparable to or higher than those of the comparative examples.

Furthermore, in the capacitor of the above-described example 1, the content of Ti (ratio of Ti) of the Ni—Ti alloy as a material constituting the first electrode layer and the third electrode layer was varied, and the relationships between the Ti contents, the dielectric losses, and the adhesion forces of the electrodes for the ceramic body were determined. TABLE 2 shows the relations.

TABLE 2

|  | Ti content (Ti ratio) | | | | |
| --- | --- | --- | --- | --- | --- |
|  | 5% by weight | 10% by weight | 15% by weight | 20% by weight | 25% by weight |
| Dielectric loss (%) | 0.35 | 0.35 | 0.41 | 0.47 | 1.21 |
| Adhesion force (N) | 37 | 38 | 49 | 57 | 57 |

As seen in TABLE 2, when the content of Ti is in the range of about 5% to about 20% by weight, desirable results, causing no practical problems, can be obtained with respect to both of the characteristics, that is, the dielectric loss and the adhesion force of the electrodes.

In the above-described preferred embodiments, the single sheet type ceramic capacitor having lead terminals is described as an example. The present invention is not limited to the single sheet type ceramic capacitor. The present invention can be applied to different types of ceramic electronic devices having the structure in which lead terminals are bonded to electrodes bonded on a ceramic element via solder.

Furthermore, in the above-described preferred embodiments, as the second and fourth electrode layers, electrode layers of Cu are preferably formed. The material for constituting the second and fourth electrode layers is not limited to Cu. Various types of combinations including at least one of Cu, Ag, and Au may be used.

In other respects, the present invention is not limited to the above-described preferred embodiments. Regarding the specific shape and size of the ceramic element and the lead terminals, the arrangement patterns of the electrodes, and so forth, various applications and modifications can be made without departing from the sprit and the scope of the present invention.

As described above, in the ceramic electronic component having lead terminals in accordance with preferred embodiments of the present invention, the electrodes each have the four layer structure including the first electrode made of an Ni—Ti alloy and adapted to be bonded to the surface of the ceramic material constituting the ceramic element, the second electrode layer made of at least one selected from the group consisting of Cu, Ag, and Au and disposed on the first electrode layer, the third electrode layer made of an Ni—Ti alloy and disposed on the second electrode layer, and the fourth electrode layer made of at least one selected from the group consisting of Cu, Ag, and Au and disposed on the third electrode layer, and the lead terminals are bonded to the electrodes having the four layer structure via solder, respectively. As a result of this unique structure, the lead terminals can be securely bonded to the electrodes, and moreover, deterioration of the characteristics of a product, caused by use in a high temperature environment can be reliably prevented.

In particular, the electrodes each having the four layer structure are preferably formed as follows.

(1) as the first electrode layer (undercoat electrode layer), the Ni—Ti alloy having high adhesion to the ceramic is used, (2) the second electrode layer made of Cu or other material suitable for securing the electric conductivity is formed thereon, (3) in addition, the third electrode layer made of an Ni—Ti alloy to suppress a solder component from diffusing is formed thereon, and (4) the fourth electrode layer made of Cu or other material having high soldering properties is formed as the surface layer, and each of the electrode layers performs the functions described above, respectively. Thus, the bonding strength of the lead terminals is greatly enhanced, and deterioration of the characteristics, caused by use in a high temperature environment is efficiently prevented, so that the reliability is greatly increased.

Furthermore, in the ceramic electronic component having lead terminals, the electrodes having high adhesion and soldering properties for the ceramic material constituting the ceramic element can be formed easily and securely by forming the first, second, third, and fourth electrode layers constituting the electrode preferably by a sputtering method, respectively. Thus, the present invention is highly and practically effective.

The electrodes having high adhesion and soldering properties for the ceramic material constituting the ceramic element can be formed easily and securely by setting the content of Ti of the Ni—Ti alloy constituting the first and third electrode layers to be in the range of from about 5% to about 20% by weight. Thus, the present invention is again highly and practically effective.

The ceramic electronic component having lead terminals having a high adhesion to the ceramic constituting the ceramic element, in which the increase of the dielectric loss, caused by heterogeneous phases produced in the ceramic, can be reduced by setting the content of Ti of the Ni—Ti alloy constituting the first and third electrode layers to be in the range of from about 5% to about 10% by weight.

Preferably, the present invention is applied to the single sheet type ceramic capacitor in which the ceramic element is a sheet ceramic body for the single type ceramic capacitor. Thereby, the single sheet ceramic capacitor having lead terminals can be obtained in which adhesion of the ceramic element to the electrodes is very high, the soldering strength of the lead terminals to the electrodes is very high, and moreover, the stability of the characteristics when the capacitor is used in a high temperature environment is excellent.

While the present invention has been particularly shown and described with reference to preferred embodiments thereof, it will be understood by those skilled in the art that the foregoing and other changes in form and details can be made without departing from the spirit and scope of the invention.

What is claimed is:

1. A ceramic electronic component comprising:

a ceramic element made of ceramic material;

a plurality of electrodes disposed on the surface of the ceramic element; and a plurality of lead terminals attached to the electrodes; wherein at least one of said electrodes has a four layer structure including:
(a) a first electrode layer made of an Ni—Ti alloy and adapted to adhere to the surface of the ceramic material constituting the ceramic element;
(b) a second electrode layer made of at least one selected from the group consisting of Cu, Ag, and Au and disposed on the first electrode layer;
(c) a third electrode layer made of an Ni—Ti alloy and disposed on the second electrode layer; and
(d) a fourth electrode layer made of at least one selected from the group consisting of Cu, Ag, and Au and disposed on the third electrode layer;

said lead terminals each being bonded to the electrodes via solder.

2. A ceramic electronic component according to claim 1, wherein the first electrode layer, the second electrode layer, the third electrode layer, and the fourth electrode layer constituting the electrodes are sputtered electrode.

3. A ceramic electronic component according to claim 1, wherein the content of Ti of the Ni—Ti alloy constituting the first and third electrode layers is in the range of from about 5% to about 20% by weight.

4. A ceramic electronic component according to claim 1, wherein the content of Ti of the Ni—Ti alloy constituting the first and third electrode layers is in the range of from about 5% to about 10% by weight.

5. A ceramic electronic component according to claim 1, wherein the ceramic element is a sheet ceramic body made of a dielectric ceramic for a single sheet type ceramic capacitor, and the ceramic electronic component is the single sheet type ceramic capacitor.

6. A ceramic electronic component according to claim 1, wherein each of the electrodes has the four layer structure.

7. A ceramic electronic component according to claim 1, wherein the ceramic element is made of one of $BaTiO_3$, $SrTiO_3$, and $TiO_2$.

8. A ceramic electronic component according to claim 1, wherein the second and fourth electrode layers are made of Cu.

9. A ceramic electronic component according to claim 1, wherein the second and fourth electrode layers are made of a combination of Cu, Ag, and Au.

* * * * *